United States Patent [19]
Baughman et al.

[11] Patent Number: 5,718,044
[45] Date of Patent: Feb. 17, 1998

[54] ASSEMBLY OF PRINTING DEVICES USING THERMO-COMPRESSIVE WELDING

[75] Inventors: Kit Baughman, Escondido, Calif.; Paul H. McClelland, Monmouth, Oreg.

[73] Assignee: Hewlett-Packard Company, Palo Alto, Calif.

[21] Appl. No.: 563,425

[22] Filed: Nov. 28, 1995

[51] Int. Cl.$^6$ .............................. B41J 2/16; B23K 13/00; B29C 65/18; H05B 6/02
[52] U.S. Cl. .................. 29/890.1; 29/620; 29/DIG. 13; 29/DIG. 24; 156/272; 219/617; 347/47; 347/63
[58] Field of Search ..................... 29/620, 890.1, 29/DIG. 13, DIG. 21, DIG. 24; 216/27; 219/78.02, 85.16, 121.71, 543, 617; 156/73.1, 73.5, 272.2; 228/110.1, 229, 232; 264/431, 457, 486, 487; 347/47, 63, 64, 203, 204, 207

[56] References Cited

U.S. PATENT DOCUMENTS

| | | | |
|---|---|---|---|
| 3,852,563 | 12/1974 | Bohorquez et al. | 347/204 |
| 3,973,106 | 8/1976 | Ura | 347/203 |
| 4,438,191 | 3/1984 | Cloutier et al. | 347/63 X |
| 4,480,259 | 10/1984 | Kruger et al. | 347/63 |
| 4,513,298 | 4/1985 | Scheu | 347/64 |
| 4,528,577 | 7/1985 | Cloutier et al. | 347/63 X |
| 4,618,516 | 10/1986 | Sager | 156/73.1 X |
| 4,635,073 | 1/1987 | Hanson | 228/110.1 X |
| 4,680,859 | 7/1987 | Johnson | 29/890.1 X |
| 4,694,308 | 9/1987 | Chan et al. | 347/47 X |
| 4,719,477 | 1/1988 | Hess | 347/59 |
| 4,733,447 | 3/1988 | Ageishi | 29/890.1 |
| 4,809,428 | 3/1989 | Aden et al. | 29/620 X |
| 4,829,319 | 5/1989 | Chan et al. | 347/47 |
| 4,847,630 | 7/1989 | Bhaskar et al. | 347/63 |
| 4,922,265 | 5/1990 | Pan | 347/47 |
| 4,926,197 | 5/1990 | Childers et al. | 347/63 |
| 4,965,611 | 10/1990 | Pan et al. | 347/64 |
| 5,008,689 | 4/1991 | Pan et al. | 347/63 |
| 5,194,877 | 3/1993 | Lam et al. | 29/890.1 X |
| 5,396,042 | 3/1995 | Ishida et al. | 219/78.02 |
| 5,455,998 | 10/1995 | Miyazono et al. | 219/121.71 X |
| 5,479,684 | 1/1996 | Murphy | 29/890.1 X |
| 5,513,431 | 5/1996 | Ohno et al. | 29/890.1 |
| 5,560,837 | 10/1996 | Trueba | 29/890.1 X |

FOREIGN PATENT DOCUMENTS 169666  7/1993  Japan .................. 29/890.1

OTHER PUBLICATIONS

Designing Parts for Ultrasonic Welding, Technical Information PW-3, Branson Ultrasonics Corporation, Jan. 1980.
"Plasma Polymerization," H. Yasuda, Academic Press, Inc. 1985, pp. 1, 2, 344, 354, 355, 360-363, 370-371.
"The Mechanics of Surface Treatment," (one page) in *Plastics Management*, May, 1988.

*Primary Examiner*—Peter Vo

[57] ABSTRACT

Components of the printing device are attached by a process employing thermo-compressive welding. The process results in a unitary, graded interface between the attached components and eliminates the need for applying thermal-cure adhesives to secure the components.

16 Claims, 1 Drawing Sheet

ASSEMBLY OF PRINTING DEVICES USING THERMO-COMPRESSIVE WELDING

TECHNICAL FIELD

This invention relates to the manufacture of pens for printing devices such as ink-jet printers.

BACKGROUND AND SUMMARY OF THE INVENTION

Pens used with printing devices are described in numerous publications, including U.S. Pat. No. 4,500,895 to Buck et al. The Buck patent describes a printing apparatus having a thermal-type ink-jet print head in communication with an ink reservoir. The print head is controlled for selectively ejecting ink drops to paper to form an image or characters.

An ink-jet type print head may include an outer layer that is designated an orifice plate. The orifice plate includes nozzles or orifices formed through it and is attached to the base of the print head. Ink is delivered from a reservoir in the body of the pen through channels formed in the print head to connect with each orifice. Drops of ink are ejected through the orifices toward the adjacent paper or other printing medium.

Mechanisms for controlled ejection of ink drops through an orifice may include a thin-film resistor, which is carried on the print head base adjacent to the orifice. Whenever a drop of ink is to be ejected from the orifice, a current pulse is directed to the resistor to ohmically heat the resistor and to vaporize a portion of the ink next to the resistor. The resultant expansion of the ink portion forces a minute ink drop through the orifice toward the paper.

In the past, the orifice plate and base components of a print head were attached by adhesives that were thermally cured. The use of thermally cured adhesives requires "tacking" the components together, employing, for example, other adhesives, prior to the application of the thermal-cure adhesive. Alternatively, the components are placed in a fixture during adhesive curing. These conventional approaches require several process steps, thereby increasing manufacturing complexity and time and the risk of component-to-component misalignment.

Adhesives may fail in harsh environments, such as is found in printing devices. Causes for such failures are many, including the forces attributable to the thermal expansion and cooling cycles of the device, the high hydrodynamic forces produced during the ink ejection cycle, and the corrosive effect of the ink.

The present invention is directed to a method of attaching components of a printing device, such as the orifice plate and print head base of an ink-jet pen, without the use of conventional thermal-cure adhesives. Accordingly, the above mentioned problems associated with the thermal-cure adhesive attachment technique are avoided.

One aspect of the invention includes a method of manufacture that can be characterized as thermo-compressive welding and includes the steps of applying a first layer of conductive material to a first component (for example, an orifice plate) of an ink-jet print head or pen. A second layer of conductive material is applied to a second component (such as the base of the print head), and an electric current is applied through the first and second conductive layers by an amount sufficient to heat those layers to melt, or initiate chemical reaction between, the portions of the first and second components that are adjacent to the first and second conductive layers. The heated portions of the first and second components are pressed together so that the heated portions of the components intermix and join.

Another aspect of the invention includes a printing device constructed in accordance with the method of the present invention.

DESCRIPTION OF A PREFERRED EMBODIMENT

Figure 1:
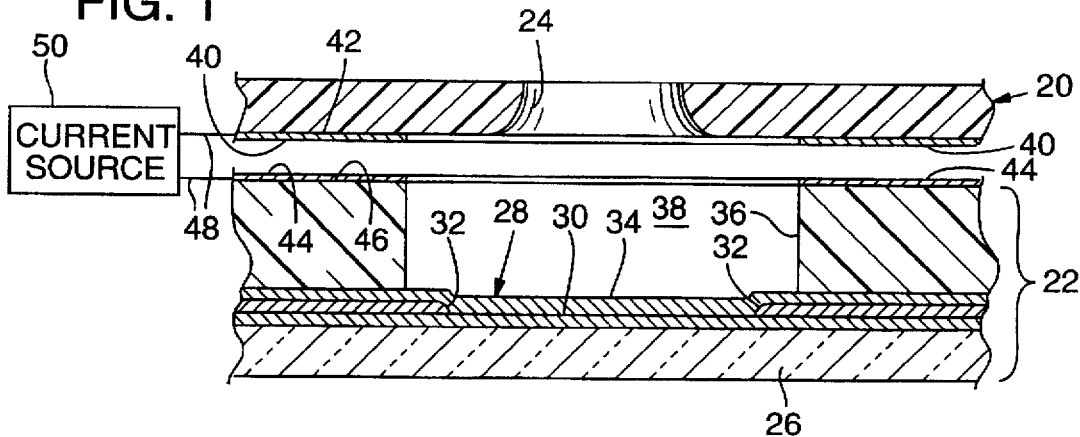
FIG. 1 is a diagram, in cross-section, illustrating the process of the present invention employed for assembling print head components of an ink-jet pen.

FIG. 1 depicts the assembly of ink-jet pen components in accordance with the present invention. In a preferred way of carrying out the process, the two components are an orifice plate 20 and a base 22 that are joined together in constructing an ink-jet print head. The orifice plate 20 is made of a thin sheet of plastic, ceramic, glass, metal, or combination thereof. The sheet is formed with a plurality of orifices, one of which 24 is shown in FIG. 1. Preferably, the orifice plate is of a polymeric material family having distinct thermoplastic behavior at useable temperatures, such as polyimides, polyether ketones, polyethylene terpthalates, polyamide imides, polysulfones, or polyesters. The preferred materials would be polyimides as manufactured by DuPont under the trademarks KAPTON E or KAPTON EKJ. The orifice plate may be, for example, 25 to 75 µm thick.

The base of the print head includes a silicon substrate 26. The substrate carries a heater 28 centered adjacent to the orifice 24. The heater comprises a tantalum/aluminum planar resistor element 30 with connected gold or aluminum leads 32. A passivation layer 34 overlies the resistor 30 to protect it from corrosion by ink.

Figure 2:
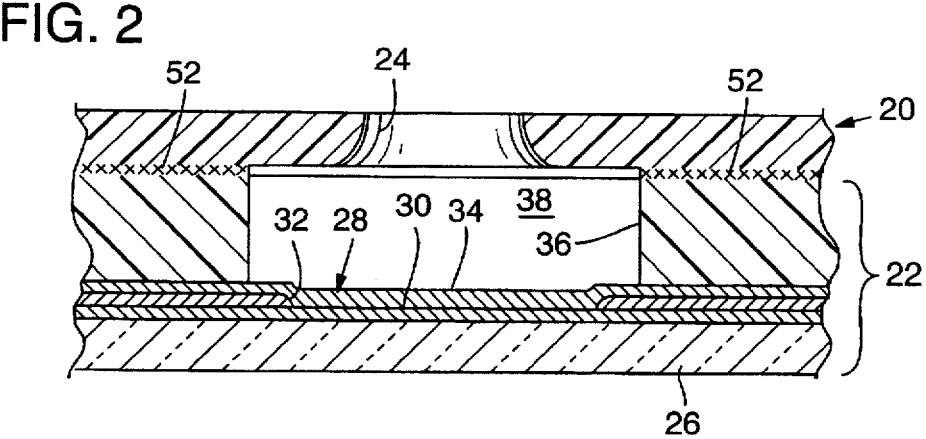
FIG. 2 is a diagram of the assembled components.

The top layer of the print head base 22 is designated a barrier layer 36 formed from a polymer, such as that manufactured by DuPont under the trademark Vacrel, but not limited to such materials. An ink channel 38 is etched into layer 36. A portion of the channel is contiguous with the orifice 24. The channel 38 directs ink by capillarity from a reservoir to the discrete volume defined by the orifice 24 and adjacent portion of the channel 38 when the print head is assembled (FIG. 2). Each orifice 24 of the plurality of orifices in the orifice plate 20 is formed to be contiguous with an ink channel.

The current pulses applied through the resistor 30 via leads 32 heat the portion of the ink that is adjacent to the heater 28, thereby rapidly vaporizing that portion. The resultant expansion of ink propels a drop of ink out of the orifice as mentioned above.

In accordance with the present invention, the orifice plate component 20 and the base component 22 of the print head are joined by thermo-compressive welding of those two components. Specifically, a thin, conductive layer 40 of material such as gold is applied as a blanket or patterned fashion to the surface 42 of the orifice plate 20 that is to be attached to the print head base 22. The conductive layer 40 is preferably in the range of 5 to 200 nanometers thick and applied by sputtering, or any other suitable means for securing the layer in position until the assembly process is complete. Preferably, the conductive layer 40 is applied so that it does not occlude any orifice 24 formed in the plate 20.

A similar conductive layer 44 is applied to the surface 46 of the barrier layer 36 that is to be attached to the underside of the orifice plate 20. Preferably, the second conductive layer 44 is arranged so that it does not cover the portion of the channel 38 that underlies the orifice 24.

Alternatively, the conductive layer may be applied to only one of the surfaces, either orifice plate or barrier layer.

The conductive layers 40, 44 are connected by leads 48 to a current source 50 so that when the two layers 40, 44 are brought into contact with one another, current flows through the layers. In this regard, the orifice plate 20 and the base 22 are pressed together so that conductive layers 40, 44 are brought into contact. The current is then applied to the conductive layers. The resistance in the conductive layers, the thickness of those layers, and the amount of current applied is selected so that the heat generated by the current flow through the conductive layers is sufficient to melt the portions of the orifice plate 20 and barrier layer 36 that are adjacent to the conductive layers 40, 44. In the preferred embodiment, a 1 to 2 amp, 1–5 μsec current pulse should be sufficient.

It is noteworthy that the current could also be inductively applied to the conductive layer(s). Alternatively, intense optical radiation, such as from a laser or a focused lamp could be employed for heating the interface of the orifice plate and base.

As a result of the melting of the portions of the orifice plate 20 and barrier layer 36, and of the pressure applied in pressing the orifice plate and base 22 together, the melted portions of these components intermix and join upon cooling. Similarly, contacting portions of the conductive layers also flow together and join upon cooling.

With reference to FIG. 2, the resultant junction of the orifice plate and barrier layer defines a generally indiscernible, graded interface as depicted by the lines of x's 52 in FIG. 2. The preferred interface being one of co-soluble, physically bondable or chemically bondable components. In essence, the junction 52 is such that the orifice plate and barrier layer become one. This arrangement is contrasted with constructions of the past where one surface was bonded by an adhesive, or directly, to another surface so that the distinct surfaces remain, which surfaces may become misaligned during the time the adhesive cures or be subject to movement apart should the adhesive fail.

It is contemplated that the graded interface may be developed without the need for heating the contacting layers by an amount sufficient to melt portions of the layers. In this regard, certain materials used for making the orifice plate and/or print head base 22 (such as polyamide imides or polyesters) are chemically reactive together upon heating, without melting. Preferably, the surfaces to be heated are first prepared via a plasma treatment involving oxygen, nitrogen, or ethyelene ions. Such plasma treatments are known in the art, as exemplified by H. Yasuda's Plasma Polymerization, Academic Press Inc., 1985. Thereafter, the surfaces are heated to initiate the chemical reaction between the layers and form the above-mentioned graded interface.

It is contemplated that the conductive layers could be applied to completely cover the surfaces 42, 46, with the resultant junction between those surfaces being solely comprised of the joined conductive layers.

The above-described process may be facilitated by heating one or both of the components to a temperature below their melting points prior to the time the current is applied to the conductive layers. Such heating will minimize the amount of time that the current needs to be applied for melting the portions of the components as described above.

It is noteworthy that the heating that occurs in the vicinity of the conductive components is quite localized. That is, neither the entire orifice plate nor barrier layer is subjected to temperatures above their melting point during the above-described process. As a result, the components will have very limited deformation, and the material properties (such as strength) of the plastics from which these components are made will not be altered by the foregoing process as might otherwise occur if the entire components were subjected to the same heat level as that generated by the current flow through the conductive layers.

It is also noteworthy that the process also permits joining of two components that have different melting points. The localized melting of the components permits this advantage.

Figure 3:
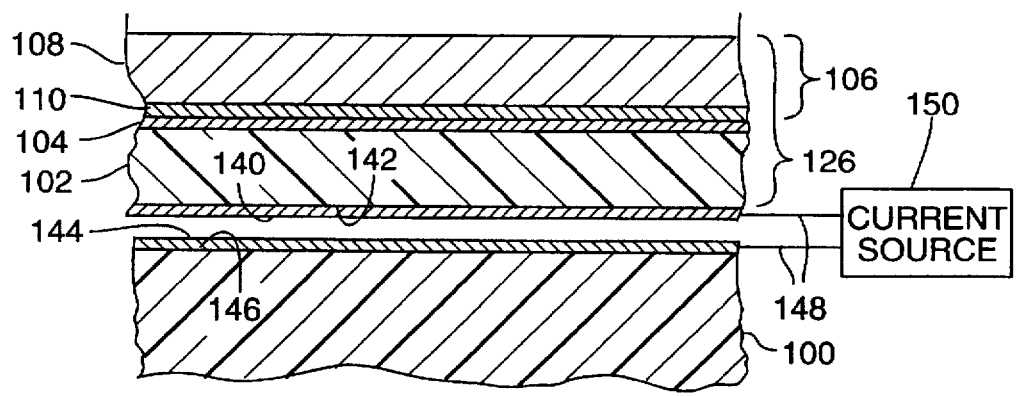
FIG. 3 is a diagram, in cross-section, illustrating use of the process for assembling a print head and pen body.

The process of the present invention may be utilized for the assembly of other components of ink-jet pens. For example, the process may be employed for joining a print head to the body of a pen. FIG. 3 depicts the process as applied for joining a print head to the body portion 100 of a plastic, ink-jet pen. In this embodiment, the substrate 126 of the print head (the parts of the print head other than the substrate 126 are omitted in FIG. 3) is formed of multiple layers, including a plastic bottom layer 102, preferably formed of a polyimide sheet, such as the Kapton product manufactured by DuPont. The bottom layer may be made of any required thickness, preferably from about 25 micrometers to 3,000 micrometers thick. A metalization layer 104 overlies the bottom layer 102. The metalization layer is preferably from about 50 angstroms to about 1,000 angstroms thick. The metalization aids in bonding the overlying structure to the bottom layer.

A dielectric structure 106 overlies the metalization layer 104. The dielectric structure 106 includes a dielectric layer 108 of material that has low electrical conductivity, such as aluminum oxide. The dielectric layer is preferably from about 0.1 to about 10 micrometers in thickness. Between the dielectric layer 108 and the metalization layer 104 is a buffer layer 110. The buffer layer 110 is preferably a layer of titanium between about 700 to about 3,000 angstroms thick. The buffer layer buffers the high tensile strain of the metalization layer 104, thereby preventing cracking of the dielectric layer.

A first conductive layer 140, substantially conforming to the conductive layer 40 described above with respect to the embodiment depicted in FIG. 1, is applied to the surface 142 of the substrate 126 that is to be brought into contact with the surface 146 of the pen body 100. Similarly, a second conductive layer 144, substantially conforming to the conductive layer 44 described above with respect to the embodiment depicted in FIG. 1, is applied to the surface 146 of the pen body 100. The components 126, 100 are thereafter pressed together so that the conductive layers 140, 144 are brought into contact. A current applied from a source 150 over leads 148 is passed through the connected conductive layers 140, 144 for heating those layers by an amount sufficient to melt the portions of the substrate 126 and pen base 100 that are adjacent to those layers 140, 144. As before, the melted portions of these components intermix and join upon cooling, forming the graded interface as discussed above.

While having described and illustrated the principles of the invention with reference to the preferred embodiments and alternatives, it should be apparent that the invention can be further modified in the arrangement and detail without departing from such principles. Accordingly, it is understood that the present invention includes all such modifications that come within the terms of the following claims and equivalents thereof.

What is claimed is:

1. A method of assembling components of a printing device, comprising the steps of:
   providing a first component;
   providing a second component;
   applying a first layer of conductive material to the first component;
   applying a second layer of conductive material to the second component;
   applying electric current through the first and second conductive layers by an amount sufficient to heat the layers, thereby melting portions of the first and second components that are adjacent to the first and second conductive layers; and
   pressing together the melted portions of the first and second components so that the melted portions of the components intermix and join upon cooling.

2. The method of claim 1 including the step of applying heat to at least one of the first and second components in addition to the heat resulting from the step of applying electric current.

3. The method of claim 1 including the step of applying heat to the first and second components in addition to the heat resulting from the step of applying electric current.

4. The method of claim 1 including the steps of:
   forming a plurality of orifices in the first component;
   providing a plurality of channels in the second component; and
   aligning individual orifices and channels so that the aligned orifices and associated channels of the joined components form a plurality of discrete volumes for containing ink.

5. The method of claim 1 including the steps of:
   providing as the first component an ink-jet print head; and
   providing as the second component an ink-jet pen body.

6. The method of claim 1 wherein the first and second components are made of non-metallic materials.

7. A method of assembling components of a printing device, comprising the steps of:
   providing a first component;
   providing a second component;
   bringing together the first and second components at an interface;
   applying heat, localized at the interface, by an amount sufficient so that portions of the first and the second components bond together at the interface, wherein the applying step includes the step of providing a layer of conductive material to at least one of the components and directing electric current through the conductive layer by an amount sufficient to heat the layers, thereby melting portions of the components that are adjacent to the conductive layer; and
   pressing together the melted portions of the first and second components so that the melted portions of the components intermix and bond upon cooling.

8. The method of claim 7 wherein the current is directed by induction.

9. The method of claim 7 wherein the applying step includes directing optical radiation to the interface to heat the interface to melt the said portions so that the said portions intermix and bond upon cooling.

10. The method of claim 7 wherein the applying heat step is carried out with substantially no thermoplastic deformation of the first or second components away from the interface.

11. The method of claim 7 wherein the first and second components are made of non-metallic materials.

12. The method of claim 7 including the step of applying heat to at least one of the first and second components in addition to the heat resulting from the step of applying the electric current.

13. The method of claim 7 wherein the first component is made of polyimide.

14. The method of claim 7 wherein the applying step and pressing step are performed in the absence of an adhesive.

15. The method of claim 7 wherein the first component has a melting point that is different than the melting point of the second component.

16. The method of claim 7 wherein in the applying step, the electric current is applied directly to the conductive layer.

* * * * *